(12) United States Patent
Hill et al.

(10) Patent No.: US 7,448,373 B2
(45) Date of Patent: Nov. 11, 2008

(54) ADJUSTMENT MECHANISM TO ADJUST GAP BETWEEN GRILLING SURFACES

(75) Inventors: David A. Hill, Rockton, IL (US); Robert E. Frisque, Milton, WI (US); Dennis J. Nelson, Rockford, IL (US)

(73) Assignee: Carrier Commercial Refrigeration Inc., Charlotte, NC (US)

( * ) Notice: Subject to any disclaimer, the term of this patent is extended or adjusted under 35 U.S.C. 154(b) by 344 days.

(21) Appl. No.: 11/003,773

(22) Filed: Dec. 3, 2004

(65) Prior Publication Data

US 2005/0120889 A1    Jun. 9, 2005

Related U.S. Application Data

(60) Provisional application No. 60/528,179, filed on Dec. 9, 2003.

(51) Int. Cl.
*A47J 37/00* (2006.01)
*A47J 37/06* (2006.01)

(52) U.S. Cl. .......................... 126/25 R; 99/379; 99/372

(58) Field of Classification Search .................. 99/379, 99/372, 426, 422; 126/25 R, 25 A, 39 R, 126/41 R
See application file for complete search history.

(56) References Cited

U.S. PATENT DOCUMENTS

| | | | | | |
|---|---|---|---|---|---|
| 4,483,239 | A | * | 11/1984 | Mueller et al. | 99/340 |
| 4,601,237 | A | * | 7/1986 | Harter et al. | 99/349 |
| 5,531,155 | A | * | 7/1996 | Pellicane et al. | 99/349 |
| 5,640,895 | A | * | 6/1997 | Anetsberger | 99/349 |

* cited by examiner

*Primary Examiner*—Steven B. McAllister
*Assistant Examiner*—Chuka C Ndubizu
(74) *Attorney, Agent, or Firm*—Carlson, Gaskey & Olds

(57) ABSTRACT

A grill includes a lower portion and an upper platen pivotably attached to the lower portion each having a grilling surface. An adjustment mechanism adjusts a dimension of the gap between the grilling surfaces between a large dimension and a small dimension. The adjustment mechanism includes a rotatable bar having a handle and a cam surface. The upper grilling surface is suspended by two cables. The cam surface is received between arms rotates the bar to move the position of the cam surface relative to the arms to adjust the gap between the grilling surfaces. This lengthens or shortens the cables to move the suspended upper grilling surface to adjust the gap between the grilling surfaces.

21 Claims, 4 Drawing Sheets

US 7,448,373 B2

ADJUSTMENT MECHANISM TO ADJUST GAP BETWEEN GRILLING SURFACES

This patent application claims priority to U.S. Provisional Application No. 60/528,179 filed on Dec. 9, 2003.

BACKGROUND OF THE INVENTION

The present invention relates generally to an adjustment mechanism that adjusts a gap between two grilling surfaces between two dimensions.

Grills or griddles are used to cook various foods, such as hamburgers. In one prior grill, the sides of the food are grilled separately. The food is placed on a grilling surface, grilling the side of the food that contacts the grilling surface. After that side of the food is cooked, the food is manually flipped to cook the opposite side. After the food is cooked, the food is manually removed from the grill for serving.

In another prior grill, both sides of the food are grilled simultaneously. After programming the type of food into a control unit, the food is placed on a lower grilling surface. An upper platen having an upper grilling surface is then lowered onto the food, positioning the food in a gap between the upper and lower grilling surfaces to simultaneously grill both sides of the food. After a predetermined amount of time has passed, the upper platen raises, and the food can be manually removed from the grill.

In prior grills, the gap between the grilling surfaces is constant and only one size of food can be cooked. A different grill is therefore needed to cook food of different sizes. However, providing multiple grills is both costly and requires additional space. It would be beneficial to provide a grill having an adjustment mechanism that allows the gap between the grilling surfaces to be adjusted to accommodate food of different sizes.

Hence, there is a need in the art for an adjustment mechanism that adjusts a gap between grilling surfaces of a grill and that overcomes the drawbacks of the prior art.

SUMMARY OF THE INVENTION

A grill includes a grilling component including a lower portion and an upper platen pivotably attached to the lower portion. The lower portion and the upper platen each include a grilling surface. Food is grilled in a gap defined between the grilling surfaces. The upper platen includes a handle that allows an operator to lift and pivot the upper platen relative to the lower portion.

An adjustment mechanism adjusts the gap between the grilling surfaces between a large dimension and a small dimension. The adjustment mechanism includes a rotatable bar having a cam surface. A stopping mechanism prevents over-rotation of the rotatable bar.

The upper grilling surface is suspended by a first cable and a second cable. A first end of each of the cables is attached to the upper grilling surface. Each cable extends from the upper platen in a substantially vertical direction, is received in a groove in a curved portion and bent approximately 90° to extend inwardly in a substantially horizontal direction. A second end of each of the cables is attached to an arm on the opposite side of the rotatable bar. The opposing arms are biased inwardly by the weight of the suspended upper grilling surface, and the cam surface is received between the opposing arms.

When the adjustment mechanism is set such that the gap has the large dimension, the cam surface is located between the two arms. To adjust the gap to the small dimension, the operator moves the handle to rotate the bar. The cam surface is then moved so that it is not located between the arms. The arms are then biased inwardly by the weight of the upper grilling surface, and the distance between the curved portion and the first end of the cable increases to lower the upper grilling surface and reduce the gap to the small dimension.

To adjust the gap to the large dimension, the operator moves the handle in the opposite direction to rotate the bar and move the cam surface so that it is located between the arms. The arms are then biased outwardly by the cam surface, and the distance between the curved portion and the first end of the cable decreases to raise the upper grilling surface and increase the gap to the large dimension.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
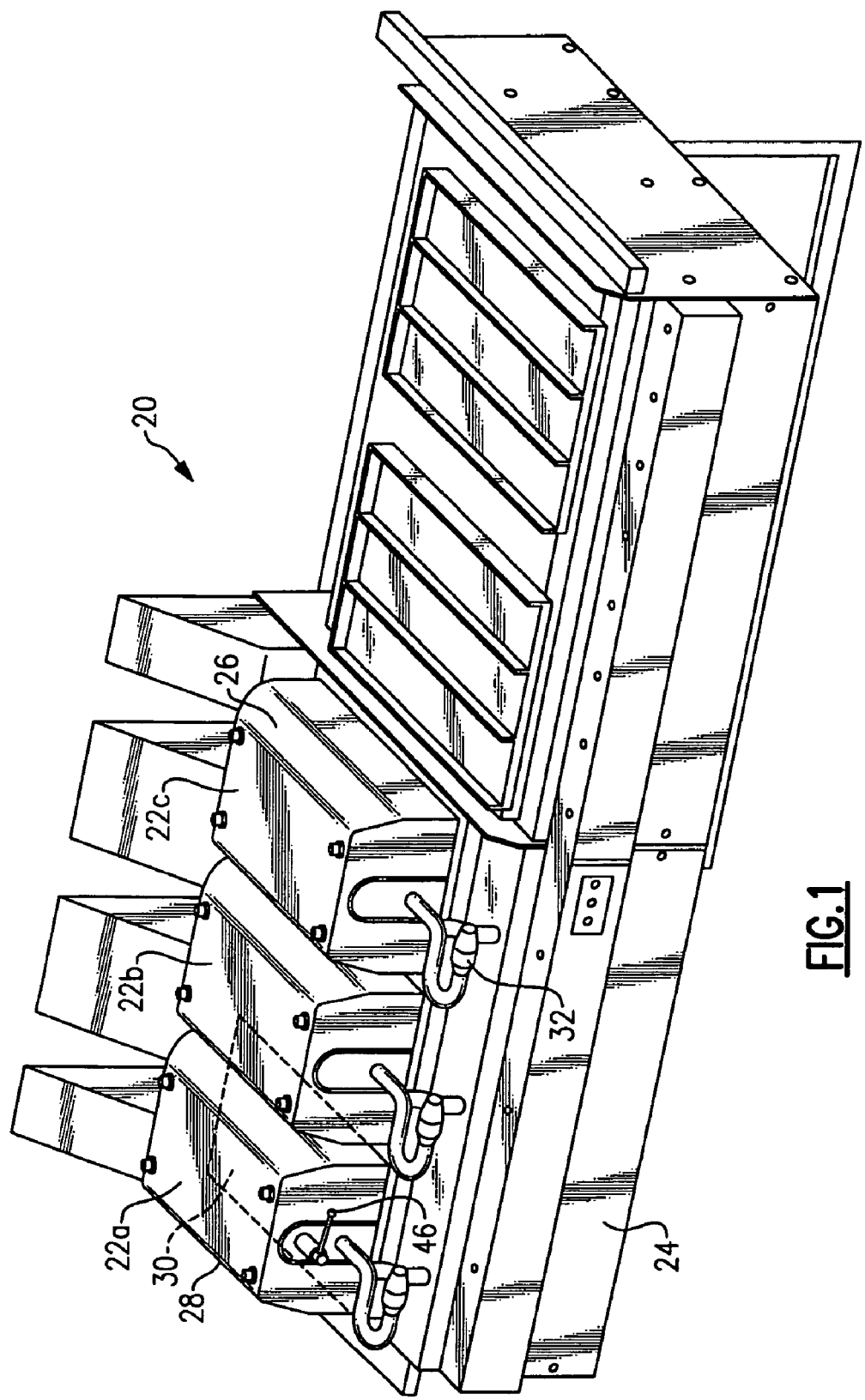
FIG. 1 illustrates a perspective view of a grill of the present invention with the upper platens lowered.

FIG. 1 illustrates a grill 20 of the present invention. The grill 20 includes three grilling components 22a, 22b and 22c each including a lower portion 24 and an upper platen 26 pivotally attached to the lower portion 24. Although three grilling components 22a, 22b and 22c are illustrated and described, any number of grilling components 22 can be employed. A handle 32 on the upper platen 26 can be grabbed by an operator to pivot the upper platen 26 relative to the lower portion 24 between a lowered position illustrated in FIG. 1 and a raised position illustrated in FIG. 2.

Figure 2:
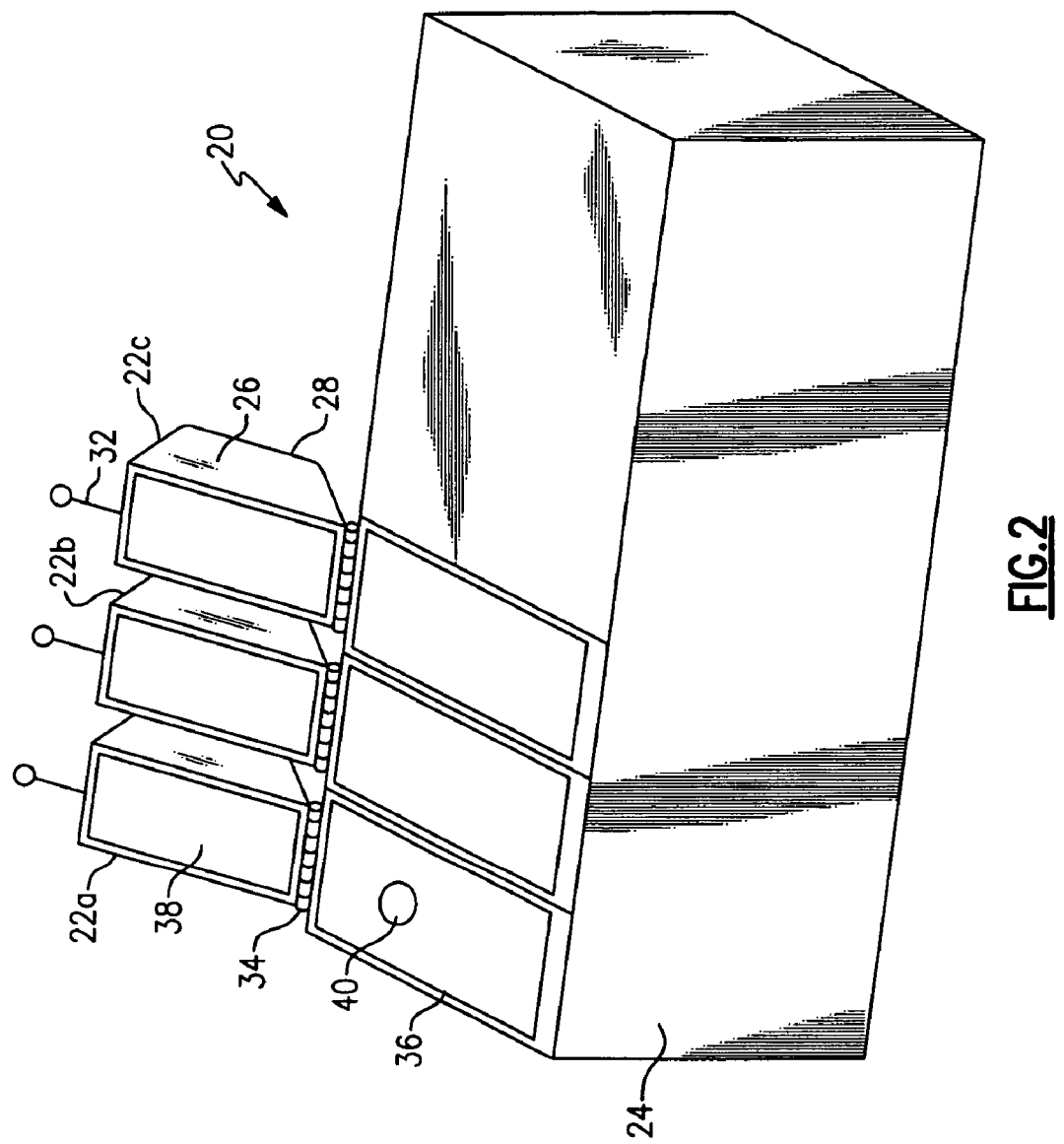
FIG. 2 illustrates a perspective view of a grill with the upper platens raised.

As shown in FIG. 2, the upper platen 26 is pivotally attached to the lower portion 24 by a hinge 34. The lower portion 24 and the upper platen 26 each include a respective grilling surface 36 and 38. When the upper platen 26 is lifted by an operator, the grilling surfaces 36 and 38 are exposed.

Food items 40 are placed on the lower grilling surface 36 by the operator for cooking. In one example, the food items 40 are hamburgers. The operator grabs the handle 32 and pivots the upper platen 26 downwardly to the lowered position illustrated in FIG. 1, positioning the food item 40 in a gap 42 (shown in FIGS. 4 and 5) between the lower grilling surface 36 and the upper grilling surface 38. The grilling surfaces 36 and 38 are heated by a respective heater 91 and 93 (shown in FIGS. 4 and 5) to cook the food items 40 in the gap 42.

Figure 3:
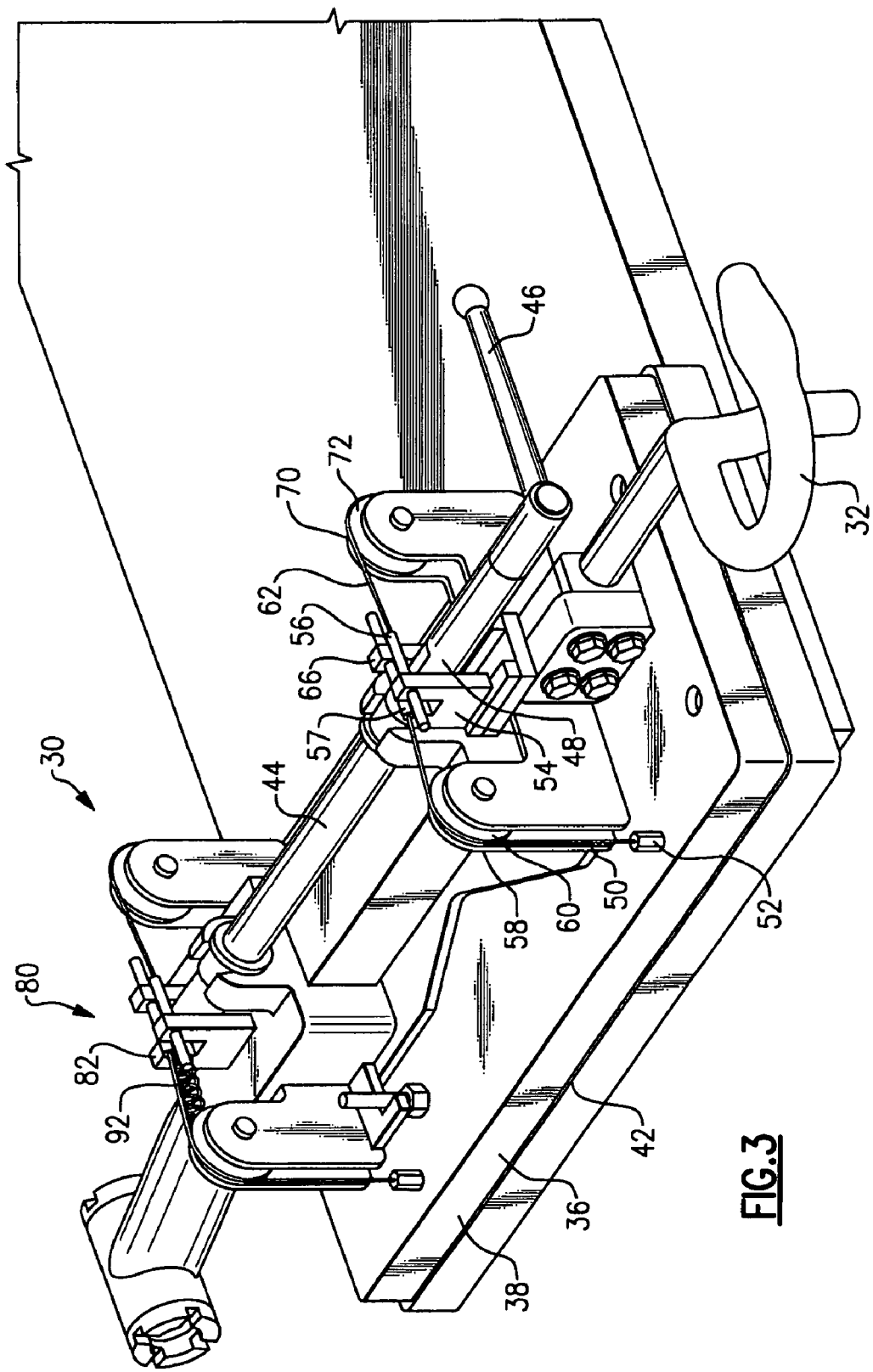
FIG. 3 illustrates a perspective view of the adjustment mechanism.

FIG. 3 illustrates an adjustment mechanism 30 that adjusts the dimension of the gap 42 between the upper grilling surface 38 and the lower grilling surface 36 between two or more dimensions. The adjustment mechanism 30 includes a rotatable bar 44 having a handle 46 and a cam surface 48. As shown in FIG. 1, the handle 46 extends through a shell casing 28 of the upper platen 26. The rotatable bar 44 is rotatable about a pivot point 74 (shown in FIGS. 4 and 5). The adjustment mechanism 30 further includes a first cable 50 and a second cable 62 from which the upper grilling surface 38 is suspended. The rotatable bar 44 is received between a first arm 66 and a second arm 54 that are biased inwardly by the weight of the upper grilling surface 38 that suspend from cables 50 and 62.

Figure 4:
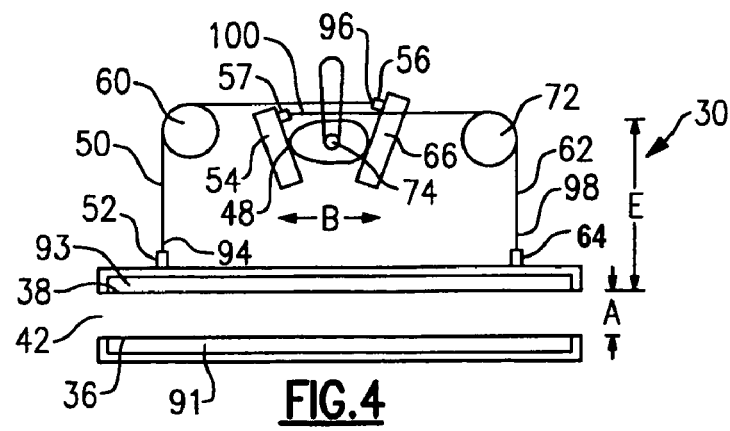
FIG. 4 illustrates a front view of the adjustment mechanism when a gap has a large dimension.
Figure 5:
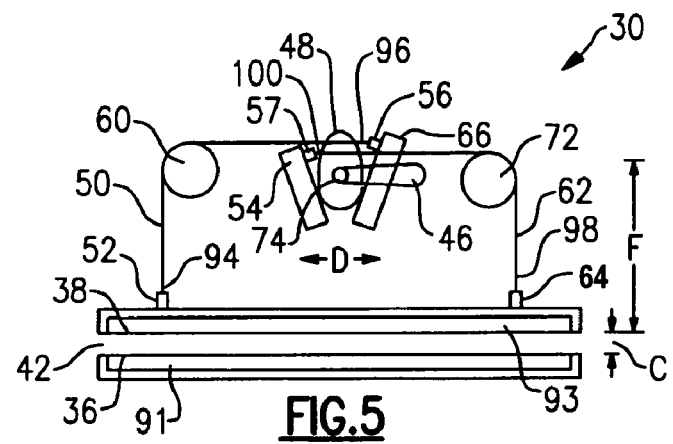
FIG. 5 illustrates a front view of the adjustment mechanism when the gap has a small dimension.

As shown in FIGS. 4 and 5, an attachment member 52 attaches an end 94 of the first cable 50 to the upper grilling surface 38. The first cable 50 extends in a substantially vertical direction, and a portion of the first cable 50 is received in a groove 58 (shown in FIG. 3) of a curved portion 60 that retains the first cable 50 on the curved portion 60. The curved portion 60 maintains tension in the first cable 50. The first cable 50 bends approximately 90° around the curved portion 60 and extends in a substantially horizontal direction. The first cable 50 extends past the second arm 54 and the rotatable bar 44, and an opposing end 96 of the first cable 50 is attached to the first arm 66 on the opposite side of the rotatable bar 44.

An attachment member 64 attaches an end 98 of the second cable 62 to the upper grilling surface 38. The second cable 62 extends in a substantially vertical direction, and a portion of the second cable 62 is received in a groove 70 (shown in FIG. 3) of a curved portion 72 that retains the second cable 62 on the curved portion 72. The curved portion 72 maintains tension in the second cable 62. The second cable 62 bends approximately 90° around the curved portion 72 and extends in a substantially horizontal direction. The second cable 62 extends past the first arm 66 and the rotatable bar 44, and an opposing end 100 of the second cable 62 is attached to the second arm 54 on the opposing side of the rotatable bar 44.

The first cable 50 and the second cable 62 cross over the rotatable bar 44. That is, the rotatable bar 44 is located between the end 94 and 98 and the opposing end 96 and 100 of each respective cable 50 and 62. Therefore, the weight of the upper grilling surface 38 biases the arms 54 and 66 inwardly towards the rotatable bar 44.

Threaded adjustment nuts 56 and 57 at the connection of the cables 50 and 62, respectively, and the arms 66 and 54, respectively, provide for fine adjustment of the dimension of the gap 42. The threaded adjustment nuts 56 and 57 can be turned to finely adjust the dimension of the gap 42 between the grilling surfaces 36 and 38.

FIG. 4 illustrates the adjustment mechanism 30 when the gap 42 between the grilling surfaces 36 and 38 has a large dimension A. The cam surface 48 is located between the arms 54 and 66, and the arms 54 and 66 are separated by a distance B. A portion of the cables 50 and 62 between the upper grilling surface 38 and the curved portions 60 and 72 has a length E.

FIG. 5 illustrates the adjustment mechanism 30 when the gap 42 between the grilling surfaces 36 and 38 has a small dimension C. The cam surface 48 is not located between the arms 54 and 66, and the arms 54 and 66 are separated by a distance D. The portion of the cables 50 and 62 between the upper grilling surface 38 and the curved portions 60 and 72 has a length F.

To adjust the gap 42 from the large dimension A to the small dimension C, the operator moves the handle 46 from the position of FIG. 4 to the position of FIG. 5. The rotatable bar 44 rotates about the pivot point 74 to remove the cam surface 48 from the space between the arms 54 and 66. The weight of the upper grilling surface 38 biases the arms 54 and 66 inwardly, reducing the space between the arms 54 and 66 to the dimension D. The length of the cables 50 and 62 between the respective curved portions 60 and 72 and the respective attachment members 52 and 64 increases to the length F, lowering the upper grilling surface 38 relative to the lower grilling surface 36 and reducing the gap 42 to the small dimension C.

To adjust the gap 42 from the small dimension C to the large dimension A, the operator moves the handle 46 in the reverse direction from the position of FIG. 5 to the position of FIG. 4. The rotatable bar 44 rotates about the pivot point 74 to move the cam surface 48 into the space between the arms 54 and 66. The arms 54 and 66 are pushed outwardly by the cam surface 48, increase the space between the arms 54 and 66 to the dimension B. The length of the cables 50 and 62 between the respective curved portions 60 and 72 and the respective attachment members 52 and 64 decreases to the length E, raising the upper grilling surface 38 relative to the lower grilling surface 36 and increasing the gap 42 to the large dimension A.

Returning to FIG. 3, each grilling component 22a, 22b and 22c includes two cam surfaces 48, two sets of cables 50 and 62 and two sets of arms 54 and 66. Each set is provided at an opposing end of the upper platen 26 of the grilling component 22a, 22b and 22c.

Figure 6:
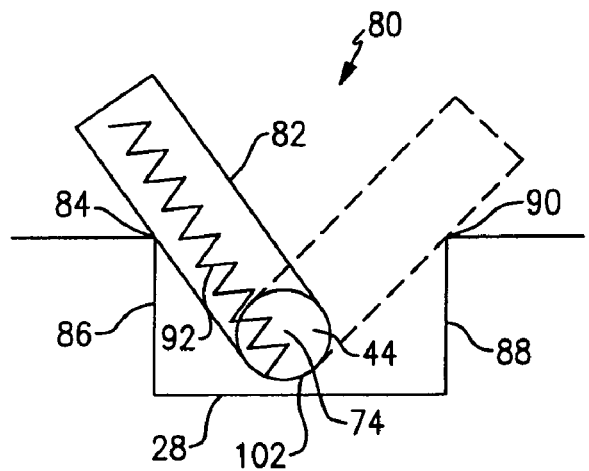
FIG. 6 illustrates the stopping mechanism of the adjustment mechanism.

FIG. 6 schematically illustrates a stopping mechanism 80 employed to prevent over-rotation of the rotatable bar 44. The stopping mechanism 80 prevents the gap 42 from becoming larger than dimension A and smaller than dimension C. The stopping mechanism 80 includes a stop arm 82 attached to the rotatable bar 44 that moves as the rotatable bar 44 pivots about the pivot point 74.

When the gap 42 is set to the dimension A, the stop arm 82 is in the position illustrated in the solid lines. The stop arm 82 contacts a contact point 84 of a wall 86, preventing over-rotation of the stop arm 82. When the gap 42 changes to the dimension C, the operator grabs the handle 46 and rotates the rotatable bar 44 about the pivot point 74. As the rotatable bar 44 pivots, the stop arm 82 moves to the position illustrated in the dashed lines until the stop arm 82 contacts the contact point 88 of a wall 90. Due to the presence of the walls 86 and 90, the stop arm 82 can only move between the positions shown in the solid line and dashed line, preventing over-rotation of the rotatable bar 44 and the gap 42 from having a dimension larger than the dimension A and smaller than the dimension C.

The stopping mechanism 80 further includes an over-center resilient member 92. One end of the resilient member 92 is attached to a base portion 102 of the upper grilling surface 38, and the other end of the resilient member 92 is attached to the stop arm 82. In one example, the resilient member 92 is a spring. The resilient member 92 ensures that the gap 42 either has the larger dimension A or the smaller dimension C and does not have an intermediate dimension.

When the gap 42 has the large dimension A, the stop arm 82 is located in the solid position shown in FIG. 6. When an operator pivots the handle 46 to change the gap 42 to smaller dimension C, the resilient member 92 is subject to tension. If the operator releases the handle 46 before the resilient member 92 reaches the over-center position, the resilient member 92 returns the rotatable bar 44 to the solid line position to ensure that the gap 42 has the large dimension A. After the resilient member 92 passes the over-center position, the resilient member 92 biases the rotatable bar 44 to the dashed line position so that the gap 42 has the small dimension C.

Conversely, when the gap 42 has the small dimension C and the operator releases the handle 46 before the resilient member 92 reaches the over-center position, the resilient member 92 returns the rotatable bar 44 to the dashed line position to ensure the gap 42 had the small dimension C. After the resilient member 92 passes the over-center position, the resilient member 92 biases the rotatable bar 44 to the solid line position so that the gap 42 has the small dimension A.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A grilling component comprising:
   a first grilling surface moveable between a raised position and a lowered position;
   a second grilling surface, wherein the first grilling surface and the second grilling surface are separated by a gap having a dimension when the first grilling surface is in the lowered position; and
   an adjustment mechanism to move the first grilling surface relative to the second grilling surface to adjust the dimension between a small dimension and a large dimension when the first grilling surface is in the lowered position, wherein the adjustment mechanism includes at least one cable that suspends the first grilling surface over the second grilling surface, wherein a portion of the cable attached to the first grilling surface is substantially vertical to suspend the first grilling surface over the second grilling surface.

2. The grilling component as recited in claim 1 wherein the first grilling surface and the second grilling surface are heated by a heater.

3. The grilling component as recited in claim 1 wherein the first grilling surface is an upper grilling surface that moves in a substantially vertical direction to adjust the dimension of the gap between the small dimension and the large dimension.

4. The grilling component as recited in claim 1 wherein the adjustment mechanism includes a bar having a cam surface, and the bar is rotatable about a pivot axis between a first position and a second position.

5. The grilling component as recited in claim 4 wherein the adjustment mechanism includes a first arm and a second arm, the bar is located between the first arm and the second arm.

6. A grilling component comprising:
   a first grilling surface moveable between a raised posit on and a lowered position;
   a second grilling surface, wherein the first grilling surface and the second grilling surface are separated by a gap having a dimension when the first grilling surface is in the lowered position; and
   an adjustment mechanism to move the first grilling surface relative to the second grilling surface to adjust the dimension between a small dimension and a large dimension when the first grilling surface is in the lowered position, wherein the adjustment mechanism includes at least one cable that suspends the first grilling surface over the second grilling surface, a first arm a second arm, and a bar having cam surface, wherein the bar is located between the first arm and the second arm and is rotatable about a pivot axis between a first position and a second position, and
   wherein the at least one cable comprises a first cable and a second cable, and a first end of the first cable and a second end of the second cable are each attached to the first grilling surface and an opposing first end of the first cable is attached to the first arm and an opposing second end of the second cable is attached to the second arm.

7. The grilling component as recited in claim 6 wherein the adjustment mechanism further includes a first curved portion having a first groove and a second curved portion having a second groove, and a first portion of the first cable is received in the first groove and a second portion of the second cable is received in the second groove.

8. The grilling component as recited in claim 7 wherein the first cable extends substantially vertically from the first grilling portion to the first curved portion, bends around the first curved portion to extend substantially horizontally, extends past the second arm and over the bar to connect to the first arm and the second cable extends substantially vertically from the first grilling portion to the second curved portion, bends around the second curved portion to extend substantially horizontally, extends past the first arm and over the bar to connect to the second arm.

9. The grilling component as recited in claim 8 wherein rotation of the bar causes movement of the first arm and the second arm to change a length of a cable portion of each of the first cable and the second cable located between the first grilling surface and the first arm and the second arm, respectively, to move the first grilling surface relative to the second grilling surface and adjust the dimension of the gap.

10. The grilling component as recited in claim 6 wherein the bar is located between the first end and the first opposing end of the first cable and the bar is located between the second end and the second opposing end of the second cable.

11. The grilling component as recited in claim 6 wherein the first grilling surface is suspended by the first cable and the second cable, and a weight of the first grilling surface biases the first arm and second arm inwardly against the bar.

12. A grilling component comprising:
   a first grilling surface moveable between a raised position and a lowered position;
   a second grilling surface, wherein the first grilling surface and the second grilling surface are separated by a gap having a dimension when the first grilling surface is in the lowered position; and
   an adjustment mechanism to move the first grilling surface relative to the second grilling surface to adjust the dimension between a small dimension and a large dimension when the first grilling surface is in the lowered position, wherein the adjustment mechanism includes at least one cable that suspends the first grilling surface over the second grilling surface, a first arm a second arm, and a bar having a cam surface, wherein the bar is located between the first arm and the second arm and is rotatable about a pivot axis between a first position and a second position, the bar further including a stop that prevents over-rotation of the bar.

13. The grilling component as recited in claim 6 wherein the cam surface of the bar is located between the first arm and the second arm and push the first arm and the second arm outwardly when the gap has the large dimension and the cam surface of the bar is not located between the first arm and the second arm and a weight of the first grilling surface biases the first arm and the second arm inwardly when the gap has the small dimension.

14. The grilling component as recited in claim 3 further including a resilient member that biases the bar to one of the first position and the second position.

15. A grilling component comprising:
   an upper grilling surface moveable between a raised position and a lowered position;

a lower grilling surface, wherein the upper grilling surface and the lower grilling surface are separated by a gap having a dimension when the first grilling surface is in the lowered position; and an adjustment mechanism to move the upper grilling surface relative to the lower grilling surface to adjust the dimension between a small dimension and a large dimension when the upper grilling surface is in the lowered position, the adjustment mechanism including:

a bar having a cam surface, wherein the bar is rotatable about a pivot axis between a first position and a second position, a first arm and a second arm, wherein the bar is located between the first arm and the second arm, and a weight of the first grilling surface biases the first arm and second arm inwardly and against the bar, and a first cable and a second cable, wherein a first end of the first cable and a second end of the second cable are each attached to the upper grilling surface and an opposing first end of the first cable is attached to the first arm and an opposing second end of the second cable is attached to the second arm, and the upper grilling surface is suspended by the first cable and the second cable, wherein when the cam surface of the bar is located between the first arm and the second arm, the cam surface pushes the first arm and the second arm outwardly to raise the upper grilling surface so that the gap has the large dimension, and wherein when the cam surface of the bar is not located between the first arm and the second arm, the weight of the first grilling surface biases the first arm and the second arm inwardly to lower the upper grilling surface so that the gap has the small dimension.

16. The grilling surface as recited in claim 15 wherein the upper grilling surface moves in a substantially vertical direction when adjusting the gap between the large dimension and the small dimension.

17. The grilling component as recited in claim 15 wherein the adjustment mechanism further includes a first curved portion having a first groove surface and a second curved portion having a second groove surface, and a first portion of the first cable is received in the first groove surface and a second portion of the second cable is received in the second groove surface.

18. The grilling component as recited in claim 17 wherein the first cable extends substantially vertically from the first grilling portion to the first curved portion, bends around the first curved portion to extend substantially horizontally, extends past the second arm and over the bar to connect to the first arm and the second cable extends substantially vertically from the first grilling portion to the second curved portion, bends around the second curved portion to extend substantially horizontally, extends past the first arm and over the bar to connect to the second arm.

19. The grilling component as recited in claim 1 wherein the first grilling surface is an upper grilling surface, and an effective length of the cable is shortened to raise the upper grilling surface and to provide the large dimension of the gap, and the effective length of the cable is lengthened to lower the upper grilling surface and to provide the small dimension of the gap.

20. The grilling component as recited in claim 1 wherein the first grilling surface is pivotable between the raised position and the lowered position.

21. The grilling component as recited in claim 20 wherein the first grilling surface is moveable in a substantially vertical direction to adjust the gap between the large dimension and the small dimension.

* * * * *

UNITED STATES PATENT AND TRADEMARK OFFICE
CERTIFICATE OF CORRECTION

PATENT NO. : 7,448,373 B2 Page 1 of 1
APPLICATION NO. : 11/003773
DATED : November 11, 2008
INVENTOR(S) : Hill et al.

It is certified that error appears in the above-identified patent and that said Letters Patent is hereby corrected as shown below:

Claim 6, Column 5, line 48: "posit on" should read as --position--

Claim 6, Column 5, line 60: insert --,-- between "arm" and "a"

Claim 6, Column 5, line 61: insert --a-- between "having" and "cam"

Claim 12, Column 6, line 48: insert --,-- between "arm" and "a"

Signed and Sealed this

Sixth Day of January, 2009

JON W. DUDAS
*Director of the United States Patent and Trademark Office*